United States Patent [19]
De Boer

[11] Patent Number: 5,941,677
[45] Date of Patent: *Aug. 24, 1999

[54] LOADING PLATFORM

[75] Inventor: Klaas Arthur De Boer, Emmeloord, Netherlands

[73] Assignee: Eco Global Patents B.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,398

[22] PCT Filed: Jul. 25, 1995

[86] PCT No.: PCT/NL95/00257

§ 371 Date: Apr. 28, 1997

§ 102(e) Date: Apr. 28, 1997

[87] PCT Pub. No.: WO96/03292

PCT Pub. Date: Feb. 8, 1996

[30] Foreign Application Priority Data

Jul. 26, 1994 [NL] Netherlands ............... 94.01224

[51] Int. Cl.⁶ ................................... B60P 1/44
[52] U.S. Cl. ............................................ 414/557
[58] Field of Search .................. 414/557, 546, 414/556, 917

[56] References Cited

U.S. PATENT DOCUMENTS

| | | | |
|---|---|---|---|
| 2,774,494 | 12/1956 | Malmström | 414/546 |
| 3,630,395 | 12/1971 | Bunge | 414/546 |
| 3,666,122 | 5/1972 | Youmans | 414/546 X |
| 3,842,997 | 10/1974 | Sprikkelman | 414/557 |
| 4,780,044 | 10/1988 | Elskamp | 414/557 |
| 4,836,736 | 6/1989 | Neagu . | |
| 5,118,246 | 6/1992 | Saussard et al. | 414/557 |
| 5,588,793 | 12/1996 | Chang | 414/557 |

FOREIGN PATENT DOCUMENTS

| | | | |
|---|---|---|---|
| 358936 | 10/1980 | Austria . | |
| 0089941 | 9/1983 | European Pat. Off. | 414/557 |
| 0277686 | 8/1988 | European Pat. Off. . | |
| 0362039 | 4/1990 | European Pat. Off. | 414/557 |
| 0363240 | 4/1990 | European Pat. Off. . | |
| 541421 | 5/1993 | European Pat. Off. | 414/556 |
| 2250562 | 4/1974 | Germany | 414/557 |
| 3043732 | 7/1982 | Germany . | |
| 9301904 | 6/1995 | Netherlands . | |
| 1027999 | 5/1966 | United Kingdom | 414/557 |

Primary Examiner—James W. Keenan
Attorney, Agent, or Firm—Webb Ziesenheim Logsdon Orkin & Hanson, P.C.

[57] ABSTRACT

The invention relates to a loading platform for mounting on a transport vehicle, having a loading flap pivotable between a substantially vertical position lying against the vehicle and a lowered, practically horizontal position, and at least one actuating member which engages on the supporting side of the loading flap for pivoting around a hinge point and which is provided with a drive assembly for controlling the orientation thereof, wherein in the lowered position the distance between the point of the actuating member located furthest from the supporting side and the supporting side of the loading flap can be reduced by the drive assembly.

7 Claims, 4 Drawing Sheets

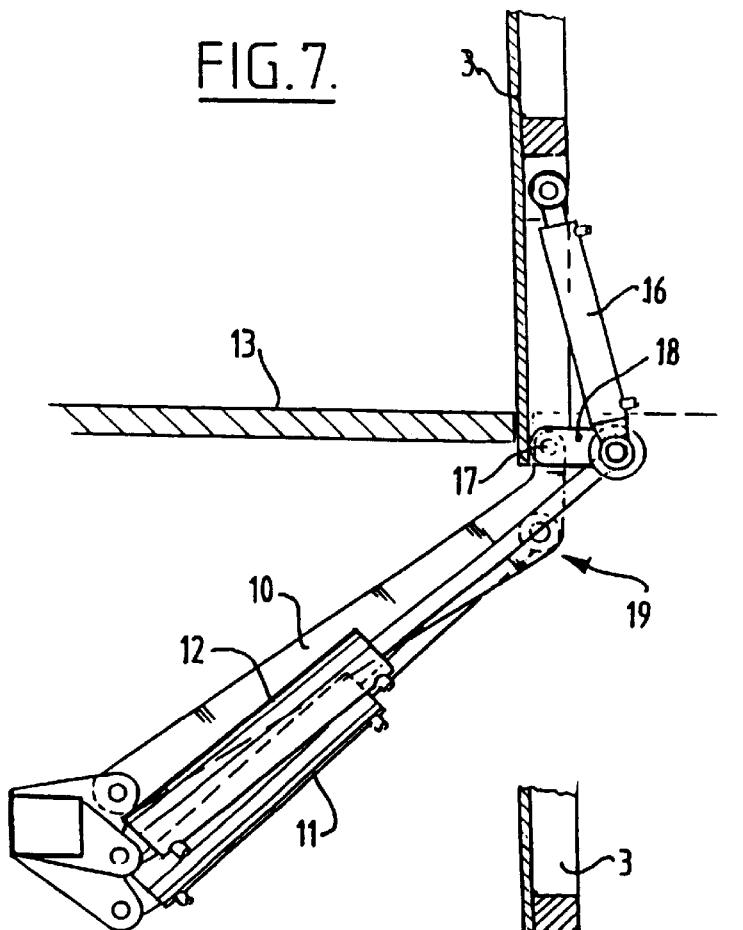

LOADING PLATFORM

BACKGROUND OF THE INVENTION

1. Field of the Invention

The invention relates to a loading platform for mounting on a transport vehicle, comprising a loading flap pivotable between a substantially vertical position lying against the vehicle and a lowered, practically horizontal position.

2. Description of the Prior Art

Such a loading platform is applied on a large scale in combination with for instance trucks. Using such a loading platform freight can be placed on the lowered loading platform, whereafter the loading flap and freight placed thereon is moved until the supporting side thereof is situated at the height of the loading floor of the truck. The freight can then be placed in simple manner in the truck. The loading flap can subsequently also be used to close the truck, for which purpose it is moved to a substantially vertical position lying against the vehicle. Unloading of the truck takes place in reverse manner. The loading platform has the important advantage that it renders superfluous lifting means for placing cargo in and removing it from a transport vehicle. A drawback of existing loading platforms however consists of a comparatively voluminous construction of the loading flap, whereby in the lowered, practically horizontal position at least a part of the supporting side of the loading flap is located at a distance from the ground. A chamfered loading flap makes it possible to move the freight on and off the loading flap. However, when freight is placed onto the loading flap a determined resistance has to be overcome. In use this means that for instance heavy roller containers must be pushed by a number of people onto the loading flap. Another drawback occurs when the loading flap is lowered. As soon as the loading flap is fully lowered, a freight placed thereon can slide/run off the loading flap. In order to prevent this the load has to be held back by a device or by a person.

SUMMARY OF THE INVENTION

The invention has for its object to provide a loading platform with which in the lowered position the loading flap can be placed more flatly on the ground than is the case with the loading flaps known up to the present time.

The invention provides for this purpose a loading platform of the type stated in the preamble comprising at least one actuating member which engages on the supporting side of the loading flap for pivoting round a hinge point and which is provided with drive means for controlling the orientation thereof, wherein in the lowered position the distance between the point of the actuating member located furthest from the supporting side and the supporting side of the loading flap can be reduced by the drive means. The actuating member connected hingedly to the loading flap serves in the substantially vertical position of the loading flap lying against the vehicle as arm for exerting a closing force on the loading flap. In the practically horizontal, lowered position of the loading flap the actuating member is however displaceable such that it protrudes downward from the supporting side of the loading flap to a lesser extent (or no longer does so at all) than in the position of the loading flap lying against the vehicle. Displacing the actuating member makes it possible to place the supporting side of the loading flap in much flatter position close to the ground. This provides the sought after functionality without loss of the positive properties of the loading platforms already known in the prior art.

The actuating member is preferably also connected to the loading flap by means of a coupling member at a distance from the hinge point with the loading flap. This coupling member is preferably connected to the loading flap for movement along a guide or to the actuating member for movement along a guide. Another preferred embodiment is characterized in that the coupling member is a member with adjustable length. These supporting variants of the loading flap also enable control of the orientation of the loading flap by controlling the orientation of the actuating member. The loading flap is controlled by controlling the actuating member.

The actuating member is preferably connected for pivoting round a second hinge point to a support arm movably connected to the transporting means. The support arm enables vertical displacement of the loading flap.

In the preferred embodiment of the loading platform the first and second hinge point coincide. This embodiment is structurally simple to manufacture.

Another preferred embodiment is characterized in that the drive means consist of a first drive for causing the support arm to move relative to the vehicle and a second drive for causing the actuating member to move relative to the support arm. The two drives provide sufficient control options for the desired freedom of movement of the loading flap.

The drive means are preferably hydraulically driven cylinders. A comparatively heavy load on the loading flap does not cause problems for a hydraulic drive.

In the preferred embodiment the actuating member is provided with a roller element at the greatest possible distance from the loading flap. When the actuating member is pivoted away in the lowered position of the loading platform, the actuating member then rolls over the ground. This reduces the force required to displace the actuating member. Wear resulting from displacing of the actuating member will also diminish.

Yet another preferred embodiment is characterized in that the loading flap is substantially a flat plate. A flat plate in particular can be placed on the ground such that the supporting side thereof can be placed at a short distance from and parallel to the ground.

BRIEF DESCRIPTION OF THE DRAWINGS

The present invention will be further elucidated with reference to the non-limitative embodiments shown in the following figures Herein:

FIG. 7 is a schematic side view of a part of an alternative loading platform, and FIG. 8 is a schematic side view of another, partly shown alternative loading platform.

DETAILED DESCRIPTION OF THE PREFERRED EMBODIMENTS

Figure 1:
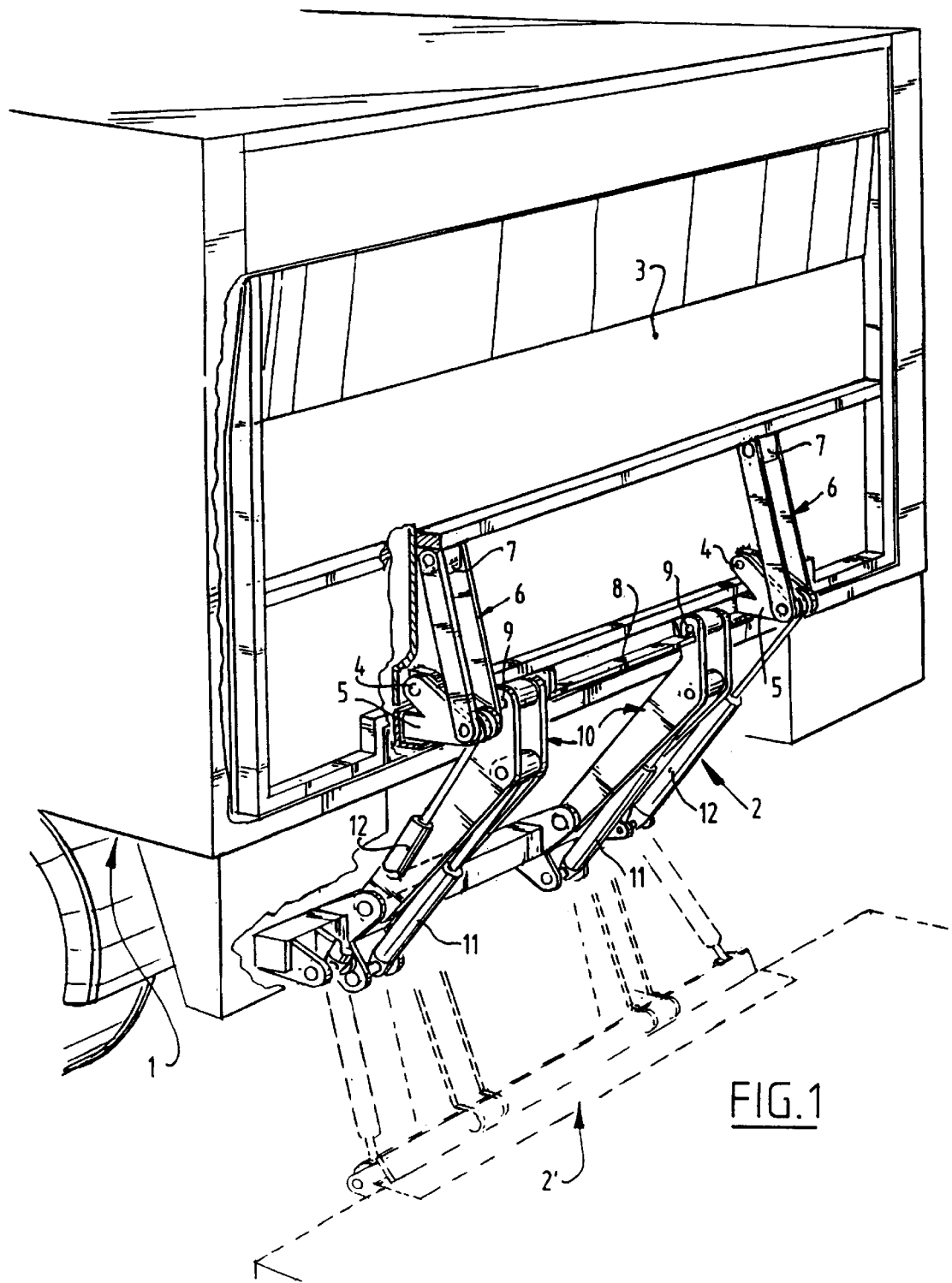
FIG. 1 shows a partly cut away perspective view of a loading platform according to the invention in a substanially tially vertical position lying against the vehicle.

FIG. 1 shows a loading platform 2 mounted on a truck 1. Loading platform 2 consists of a loading flap 3 to which two actuating members 5 are mounted on the supporting side for pivoting round hinge points 4. Each actuating member 5 is also connected to loading flap 3 by means of a coupling member 6. The coupling members 6 are displaceable relative to loading flap 3 along guides 7 connected to loading flap 3. The actuating members 5 are connected to two support arms 10 for pivoting round a second hinge point 9 with interposing of an angle section 8. The figure also shows two first drive cylinders 11 for causing support arms 10 to move and two second drive cylinders 12 for causing the actuating members 5 to pivot relative to support arms 10. In broken lines the loading platform 2' is shown in the fully lowered situation and placed on the ground, as further elucidated in FIG. 6.

Figure 2:
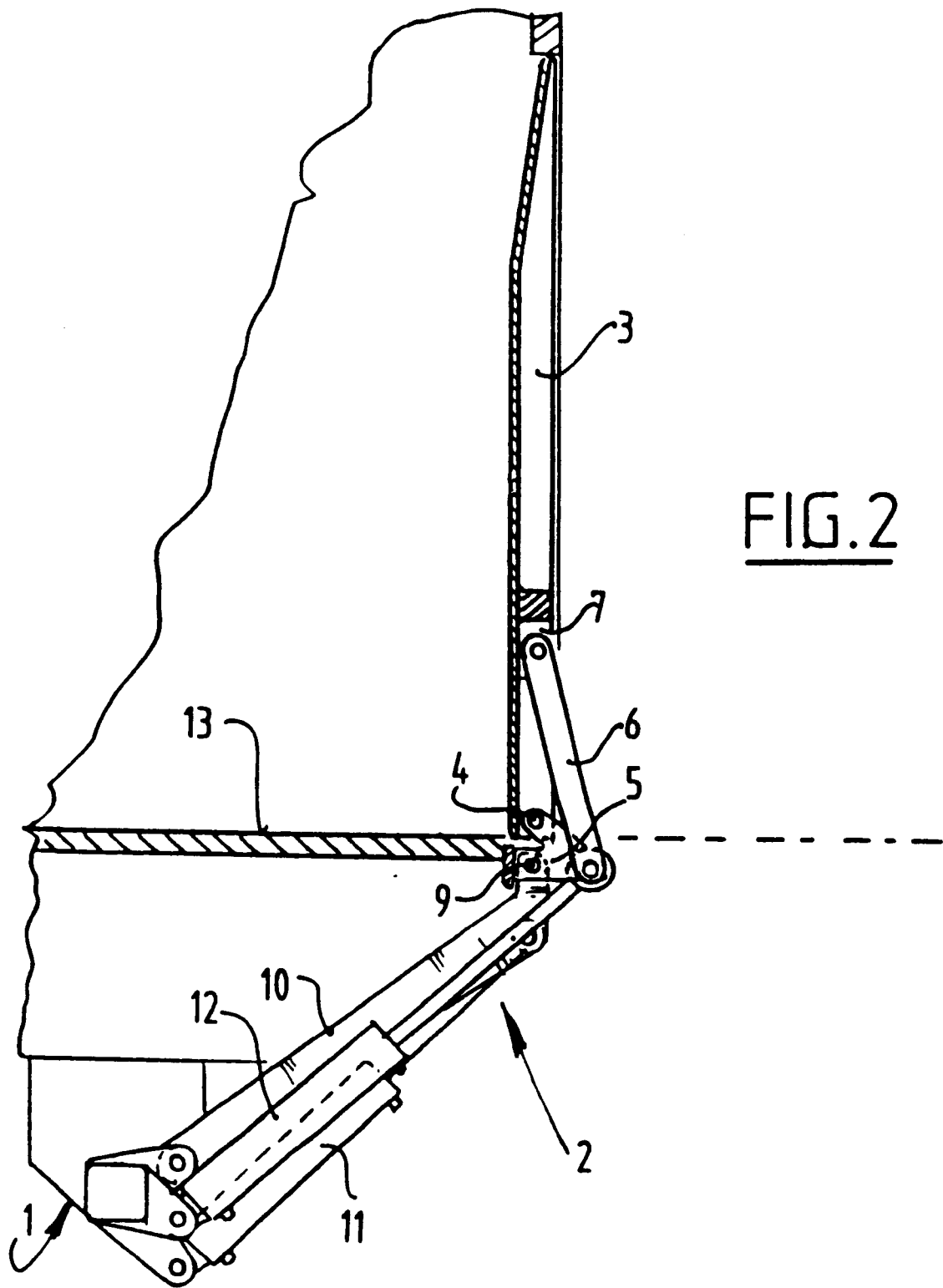
FIG. 2 is a schematic side view of the loading platform of FIG. 1 in substantially vertical position lying against the vehicle.

FIG. 2 shows a side view of the loading platform 2. Also shown clearly is a loading floor 13 of the truck 1.

Figure 3:
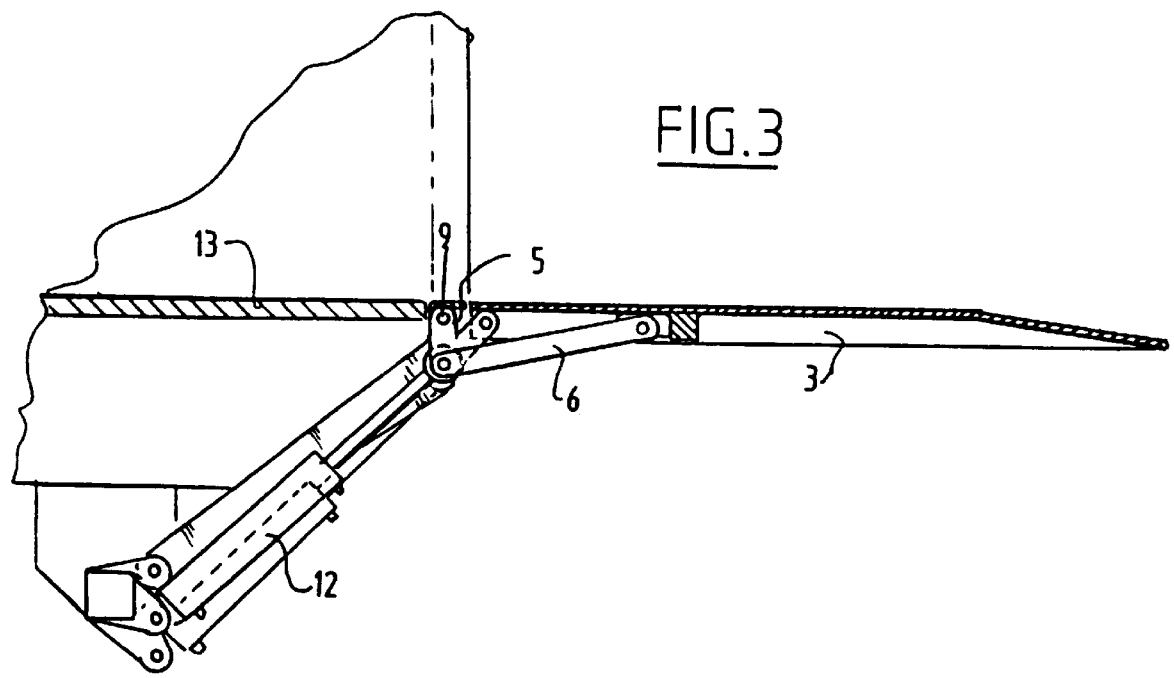
FIG. 3 is a schematic side view of the loading platform of FIG. 1 and 2 in horizontal position lying at the height of the loading floor of the vehicle.

In FIG. 3 the loading flap 3 is displaced relative to the situation of FIG. 2 such that the supporting side of loading flap 3 lies horizontally at the height of loading floor 13.

Figure 4:
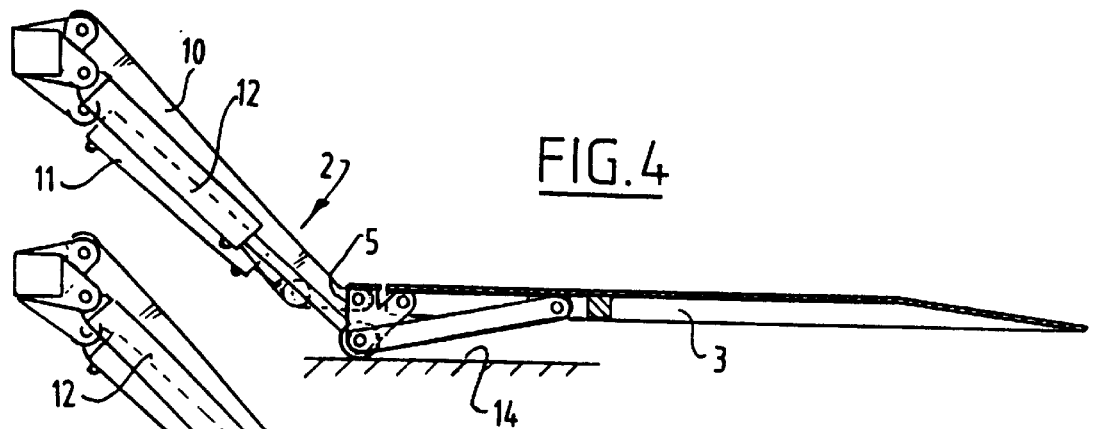
FIG. 4 is a schematic side view of the loading platform of the foregoing figures in lowered position placed just above the ground.

In FIG. 4 the loading platform 2 is lowered to a position close to the ground 14. For this purpose the support arm 10 is displaced by the first drive cylinder 11. During the movement of the loading flap 3 the second drive cylinder 12 will ensure, synchronously with the first drive cylinder 11, a constant horizontal position of loading flap 3. The actuating member 5 now makes contact with the ground 14.

Figure 5:
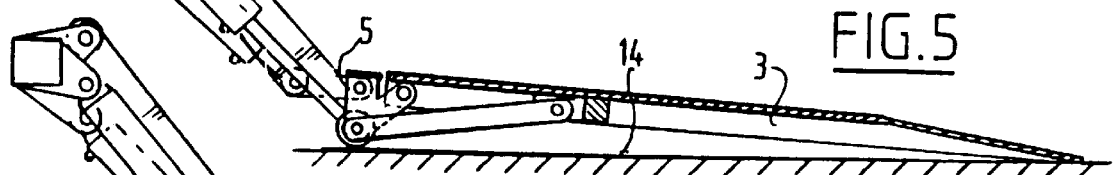
FIG. 5 is a schematic side view of the loading platform of the foregoing figures in lowered position supporting partially on the ground.

In FIG. 5 actuating member 5 is tilted slightly by making shorter the second drive cylinder 12. A part of loading flap 3 will thereby come to rest on the ground 14. In order to allow the actuating member 5 to rest on the ground 14 the first drive cylinder 11 is also made a little shorter. Thus far the operation of the loading platform 2 corresponds to a very large extent with already existing platforms.

Figure 6:
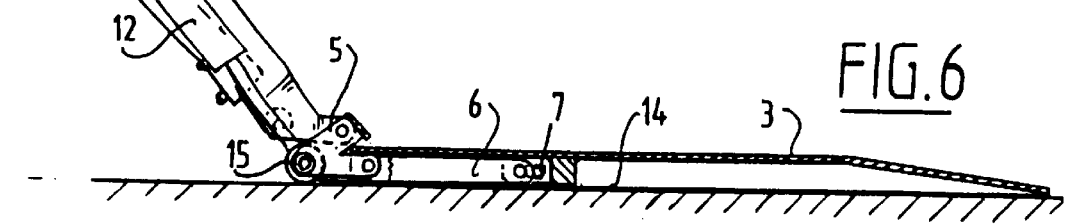
FIG. 6 is a schematic side view of the loading platform of the foregoing figures in flat position fully supported by the ground.

In FIG. 6 the actuating member 5 is rotated further round hinge point 4 by the second drive cylinder 12. Actuating member 5 comprises a roller element 15 whereby it is displaceable over the ground 14 relatively simply. The coupling member 6 herein also slides in the guide 7. Because actuating member 5 is now pivoted away beneath loading flap 3 and the second drive cylinder 11 is further retracted, the loading flap 3 can now be placed completely flat on the ground 14.

FIG. 7 shows a variant wherein a coupling member 16 is formed by an element of adjustable length. The coupling member 16 does not in this case have to be fixed using a guide. The above described hinge points 4 and 9 also coincide in a common hinge point 17. A comparatively simple actuating member 18 can now replace the above shown actuating member 5. The operation of loading platform 19 is however wholly comparable with that of the above shown loading platform 2. In a possible further variant the second drive cylinder 12 can be omitted and the element of adjustable length 16 also functions as second drive. This alternative is otherwise not shown in a figure.

In the variant finally shown in FIG. 8, a coupling member 20 is provided with a guide 21 on the side facing toward the actuating member 5. This variant only differs very slightly from the variant shown in FIGS. 1–6.

I claim:

1. A loading platform for mounting on a transport vehicle, comprising:

a loading flap movable between a substantially vertical position lying against the vehicle and a lowered, substantially horizontal position;

at least one actuating member which is pivotable around a first hinge axis connected to a supporting side of the loading flap;

a support arm having one end configured to connect to the transport vehicle and the other end pivotable around a second hinge axis connected to the actuating member;

first drive means for moving the support arm relative to the vehicle;

second drive means connected to the actuating member for controlling the orientation of the actuating member; and a coupling member having a first end pivotally connected to the actuating member spaced from the first hinge axis and a second end pivotally connected to the loading flap, wherein the first and second hinge axes are spaced from one another.

2. The loading platform as claimed in claim 1, wherein the coupling member is connected to the loading flap for movement along a guide substantially parallel to the loading flap.

3. The loading platform as claimed in claim 1, wherein the coupling member is connected to the actuating member for movement along a guide substantially parallel to the coupling member.

4. The loading platform as claimed in claim 1, wherein the coupling member is a member of adjustable length.

5. The loading platform as claimed in claim 1, wherein the first and second drive means include hydraulically driven cylinders.

6. The loading platform as claimed in claim 1, wherein the actuating member includes a roller element.

7. The loading platform as claimed in claim 1, wherein the loading flap is a substantially flat plate.

* * * * *